United States Patent [19]

Klein et al.

[11] Patent Number: 4,584,609
[45] Date of Patent: Apr. 22, 1986

[54] PARALLEL-INPUT/SERIAL OUTPUT CCD REGISTER WITH CLOCKING NOISE CANCELLATION, AS FOR USE IN SOLID-STATE IMAGERS

[75] Inventors: John J. Klein, Westwood; Michael J. Cantella, Winchester, both of Mass.

[73] Assignee: RCA Corporation, Princeton, N.J.

[21] Appl. No.: 723,148

[22] Filed: Apr. 15, 1985

[51] Int. Cl.$^4$ ............................................. H04N 3/15
[52] U.S. Cl. .................................... 358/213; 358/221
[58] Field of Search ............... 358/213, 211, 212, 209, 358/221, 48, 44, 113; 357/24 LR, 24; 250/578, 211 J

[56] References Cited

U.S. PATENT DOCUMENTS

| | | | |
|---|---|---|---|
| 4,064,533 | 12/1977 | Lampe et al. | 358/105 |
| 4,079,423 | 3/1978 | Diehl | 358/213 |
| 4,498,105 | 2/1985 | Crawshaw | 358/213 |
| 4,514,766 | 4/1985 | Koike et al. | 358/213 |
| 4,527,200 | 7/1985 | Takahashi et al. | 358/213 |

Primary Examiner—Gene Z. Rubinson
Assistant Examiner—Robert G. Lev
Attorney, Agent, or Firm—Joseph S. Tripoli; George E. Haas; Allen L. Limberg

[57] ABSTRACT

Alternate ones of the charge transfer stages in the CCD output register of a solid-state imager are loaded with charge packets descriptive of the intensities of respective image elements. The intervening charge transfer stages are loaded with charge packets descriptive of a reference level. Subsequently, the CCD output register is operated as a shift register to serially supply charge packets to an electrometer. Successive samples of the electrometer response are differentially combined to obtain an output signal with undesired components suppressed therein.

7 Claims, 3 Drawing Figures

PARALLEL-INPUT/SERIAL OUTPUT CCD REGISTER WITH CLOCKING NOISE CANCELLATION, AS FOR USE IN SOLID-STATE IMAGERS

The invention relates to cameras using solid-state imagers and, more particularly, to the serial extraction of image element (pixel) samples from such an imager using a charge-coupled device (CCD) output shift register.

BACKGROUND OF THE INVENTION

A wide variety of solid-state imagers use CCD output shift registers to convert to serial-in-time formal charge packets loaded parallel-in-time into respective ones of its successive charge transfer stages. These CCD output shift registers are parallel-input/serial-output CCD registers. Generally, the charge packets supplied serially in time from the CCD output shift register are then sensed in a charge sensing stage to generate samples of a video output signal voltage (or current). Line arrays of photosensors can transfer their respective photoresponses through a parallel-transfer register to side-load the charge transfer stages of the CCD output shift register, for example. Certain metal-oxide-semiconductor (MOS) imagers have their MOS sensors polled a line at a time to side-load the CCD output shift register. CCD imagers of interline transfer, of field transfer, and of line transfer types typically use side-loaded CCD output shift registers.

The charge sensing circuitry in such solid-state imagers detects minute variations in the size of successive charge packets serially supplied from the CCD output shift register. This is done in the presence of substantially large unwanted signals. A principal source of these signals is associated with the CCD shift register portions of the solid-state imager being disposed in a semiconductive substrate, which substrate is very difficult to hold at a fixed potential because of the presence of clocking signals of several volts being capacitatively coupled to it. Extensive selective filtering is customarily required to separate the wanted output signal from the unwanted clocking signal, or "clock noise" as it is commonly termed.

This selective filtering may be provided by low-pass filtering to discriminate against clocking signal. Alternatively, this selective filtering may be provided by synchronous detection at a harmonic of CCD output shift register clocking rate, followed by low-pass filtering. The low-pass filtering processes may be linear processes or may involve non-linear processes, such as sampling and holding.

Arrangements for cancellation of clock noise are known in the art, also. Caywood in U.S. Pat. No. 3,806,729, issued APR. 23, 1974, and entitled "CHARGE COUPLED DEVICE IR IMAGER" describes the collection of charge elements alternately from the scene and from a uniform background reference source in the columnar shift registers that are components of the image register of a field transfer CCD imager. The imager is provided with two CCD output shift registers parallelly disposed at the ends of the columnar shift registers that are components of its field storage register. A row of charge elements descriptive of the image is transferred in parallel from the columnar shift registers to respective ones of the charge transfer stages in one of the CCD output shift registers, and an adjacent row of charge elements descriptive of background reference source (provided by masked rows in the image register) is transferred in parallel from the columnar shift registers to respective ones of the charge transfer stages in the other of the CCD output shift registers. The first of these parallel transfers is through the charge transfer stages of the CCD output shift register proximate to the field storage register, to the charge transfer stages of the CCD output shift register distal from the field storage register. After both being side-loaded, the two output shift registers are forward clocked in synchronism. Each pair of charge elements concurrently clocked from the output shift registers are differentially sensed. This differential sensing not only reduces background variations (chiefly accumulated dark current), but also reduces clock noise.

A problem with the Caywood arrangement is that it doubles the number of rows (and, consequently, the number of charge transfer stages) in the imager. The attendant doubling of the imager die size makes the Caywood approach infeasible. The problem of dark current noise cancellation has subsequently been solved in ways that do not require great increase in die size. Better ways of effecting dark current cancellation are described by P.S. Levine in U.S. Pat. No. 4,496,982, issued Jan. 29, 1985, and entitled "COMPENSATION AGAINST FIELD SHADING IN VIDEO FROM FIELD-TRANSFER CCD IMAGERS", by D.D. Crawshaw in U.S. Pat. No. 4,498,105, issued Feb. 5, 1985, and entitled "FIELD-TRANSFER CCD IMAGERS WITH REFERENCE-BLACK-LEVEL GENERATION CAPABILITY"; and by P.A. Levine in U.S. patent application Ser. No. 687,368, filed Dec. 28, 1984, entitled "CHARGE-STORAGE-WELL DARK CURRENT ACCUMULATOR WITH CCD CIRCUITRY", and assigned to RCA Corporation. U.S. Pat. Nos. 4,496,982 and 4,498,105 are incorporated herein by reference.

The present invention concerns a way of suppressing clock noise in the output video signal from a solid-state imager without greatly increasing the size of the imager. The present invention is also concerned with the problem of suppressing fat zero bias charge which may have been added to charge packets descriptive of image elements upon their admission to the output shift register. Such addition of bias charge is done in order to improve transfer efficiency through the output shift register for low-level charge packets.

SUMMARY OF THE INVENTION

The invention is embodied in a solid-state imager having a CCD output shift register. Alternate ones of the successive charge transfer stages of the shift register are arranged to receive in parallel respective charge packets descriptive of the intensities of a line of a radiant energy image. The intervening alternate charge transfer stages are not parallelly loaded and receive no image responsive components. During a line trace time the successive charge packets that are serially unloaded from the CCD output shift registers alternate between being image responsive and not being image responsive. The two types of charge packets are separated by alternate selection and responses to them are differentially combined to suppress clock noise and, if fat zero biasing is used, to suppress the fat zero.

DETAILED DESCRIPTION

Figure 1:
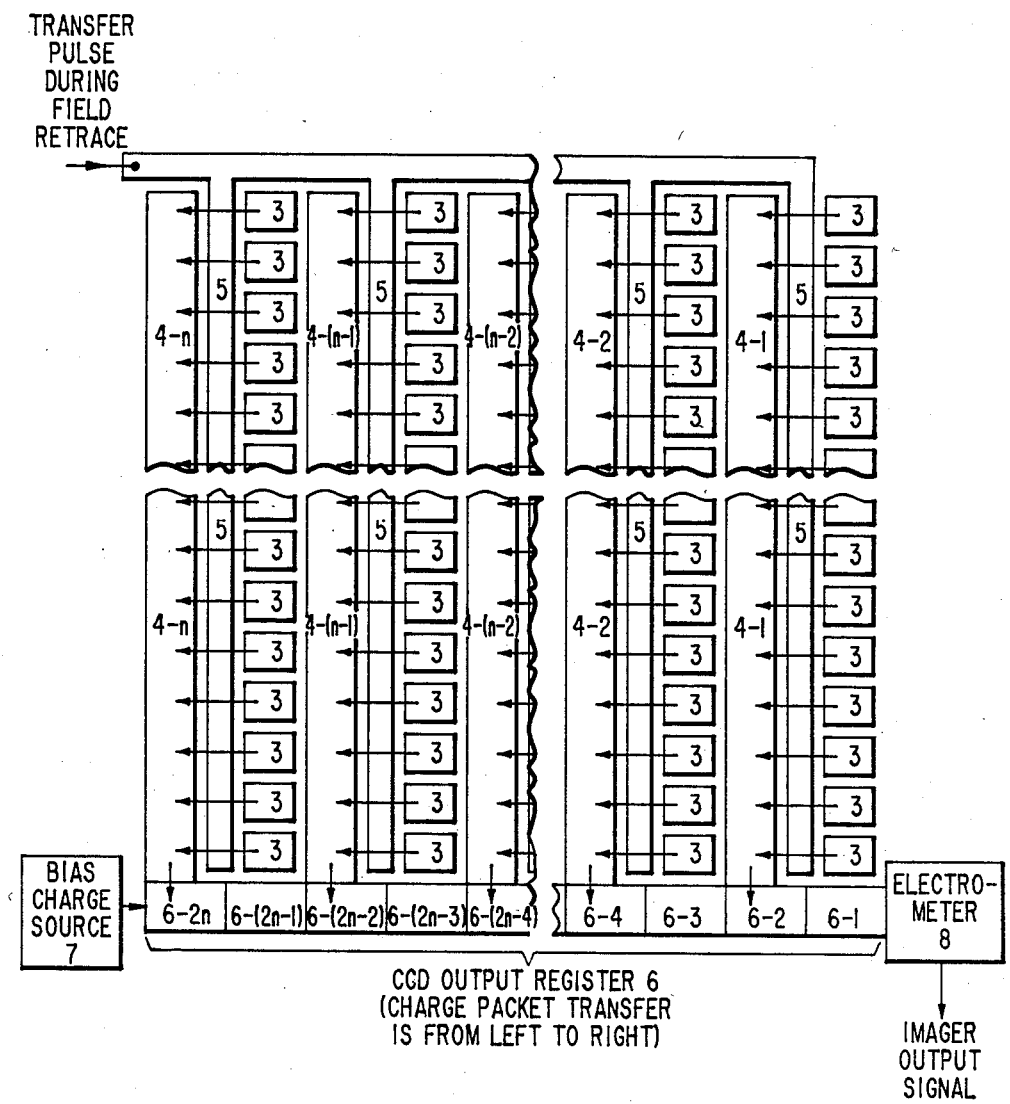
FIG. 1 is a schematic diagram of an interline transfer type of CCD imager that is representative of the types of solid-state imager which may be used as a component of a camera embodying the invention.

The FIG. 1 CCD imager is an interline transfer type, which can be used in an embodiment of the invention as will be described later on with reference to FIG. 2. An area array of photosensors 3 accumulate charge packets responsive to the photoconversion of the radiant energy in respective elements (or "pixels") of the image being electronically photographed. The photoconversion processes are permitted to go forward for prescribed time intervals, called "image integration intervals", usually corresponding substantially with the field scan intervals of a television signal generated from the output signal samples of the imager. After each image integration interval, usually between each pair of successive field scan intervals, the charge packets accumulated in photosensors 3 are transferred into a temporary field storage register 4. This field storage register 4 comprises a plurality, n in number, of CCD charge transfer channels 4-1, 4-2, . . . 4-n in parallel array. This transfer can be carried forward by the lowering of potential energy barriers to such transfer by changing the potential applied to a transfer gate structure 5. During the transfer of charge packets from photosensors 3, the cyclic variation of plural-phase clocking voltages applied to gate electrodes (not shown) overlying the charge transfer channels 4-1, 4-2, . . . 4-(n-1), 4-n is halted. The pattern of clocking voltages applied to the gate electrodes overlying charge transfer channels 4-1, 4-2, . . 4-n define the successive charge transfer stages in each of these channels into which are transferred charge packets from those of photosensors 3 immediately to their right.

In the ensuing field scan there is a resumption of the cyclic variation of the plural-phase clocking voltages applied to the gate electrodes overlying the charge transfer channels 4-1, 4-2, . . . 4-(n-1), 4-n. Clocking is at line advance rate, to transfer the charge packets during each line retrace interval in field scan in each of the charge transfer channels 4-1, 4-2, . . . 4-(n-1), 4-n forward one charge transfer stage. The line of charge packets transferred out of the output ports of charge transfer channels 4-1, 4-2, . . . 4-(n-1), 4-n are side-loaded into alternate charge transfer stages of CCD output register 6, to merge with fat zero bias charges already in those stages. CCD register 6 has a plurality, 2n in number, of successive charge transfer stages. Each charge transfer stage is identified by a compound reference character, 6 hyphenated and followed by a specific charge transfer stage number. Each specific charge transfer number is decremented by one from the specific number of the preceding charge transfer stage. Charge transfer stages in output register 6 with even specific numbers are shown side-loaded by respective ones of the field storage register charge transfer channels 4-1 through 4-n. When output register 6 is being side-loaded there is a halt in the cyclic variation of its clocking voltages which place potential energy wells at the ends of charge transfer channels 4-1, 4-2, . . . 4-(n-1), 4-n to receive charge packets transferred therefrom.

During each line trace interval, field storage register 4 clocking voltages are static, and the cyclic variation of output register 6 clocking resumes. Charge packets are advanced a stage at a time at twice the pixel clock rate to serially supply charge packets to an electrometer 8. As charge packets advance in output register 6, fat zero bias charge packets are loaded into the input port of output register 6 from the bias charge source 7.

Figure 2:
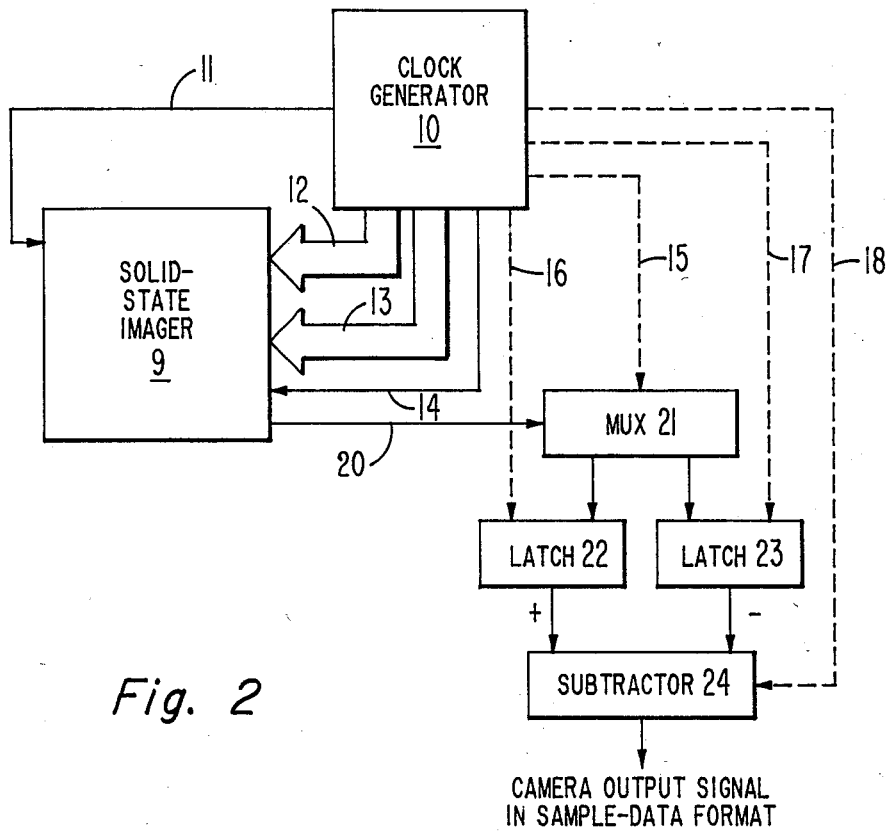
FIG. 2. is a schematic diagram of a camera embodying the invention.

FIG. 2 shows a camera apparatus embodying the invention. The FIG. 2 camera apparatus comprises a solid state imager 9, which by way of example may be the interline transfer type CCD imager of FIG. 1. A clock generator 10 supplies the appropriate clocking voltages and other timed signals to imager 9. Supposing imager 9 to be the interline transfer CCD imager of FIG. 1, these signals would include a field transfer pulse-supplied via a connection 11, a plural-phase field storage register 4 clocking signal supplied via a multi-connection bus 12, a plural-phase output register 6 clocking signal supplied via a multi-connection bus 13, and (further supposing electrometer 8 to be a floating-diffusion type) reset pulses supplied to electrometer 8 via a connection 15. The imager output signal samples supplied by the imager 9 electrometer on an output connection 20 are alternately responsive to elements of the radiant energy image impinging on imager 9 and responsive to a zero level. Switching multiplexer 21 separates the two sets of samples, receiving switch control signal from clock generator 10 via a connection 15. Responsive to control signals received from clock generator 10 via connections 16 and 17, respectively, latches 22 and 23 store the last-received sample responsive to the image and the last-received sample not responsive to the image respectively. Latch 22 and latch 23 output signals are respectively supplied to the minuend input and to the subtrahend input of a subtractor 29. Subtractor 29 supplies a stream of output samples that are equal to respective ones of the samples responsive to the image minus the leading-in-time or the trailing-in-time sample non-responsive to image, depending on the timing of the pixel rate pulses supplied to subtractor 24 from clock generator 10. This cancels fat zero in the camera output signal samples, as well as most clock noise.

The system may be analog, with latches 22 and 23 being sample-and-hold circuits. Or, an analog-to-digital converter may be included in connection 20 with circuits 21–24 operating digitally.

Figure 3:
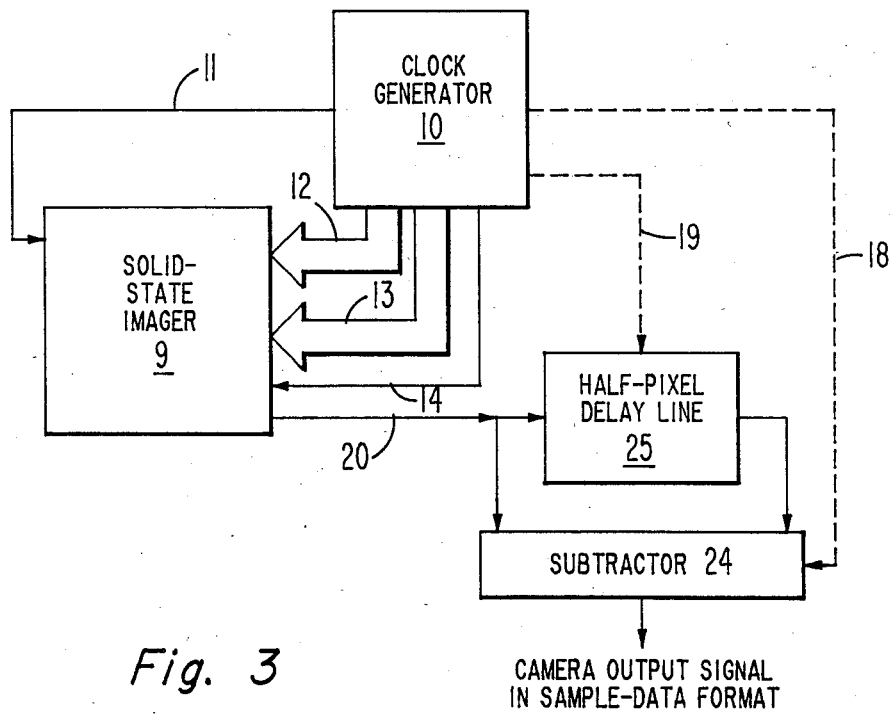
FIG. 3 is a schematic diagram of another camera embodying the invention.

The FIG. 3 camera is an alternative embodiment of the invention in which elements 21–23 of FIG. 2 are replaced by a half-pixel delay line 25. Delay line 25 is, by way of example, a one-stage clocked delay line receiving twice-pixel-rate clocking signal from clocking generator 10 via a connection 19. Alternatively, delay line 25 may be a one-shot, or monostable multivibrator.

A number of other embodiments of the invention will readily occur to one skilled in the art and equipped with this disclosure. For example, each sample responsive to the image may have the mean of the flanking samples non-responsive to the image substracted therefrom, rather than just one of the flanking samples. As a further example subtractor 24 may be strobed at twice pixel rate to generate camera output signal on a pixel rate carrier to be synchronously detected, for suppressing flicker noise. The invention can find use with all solid-state imagers having a CCD output-register—e.g., CCD imagers of field transfer or of line transfer type, or MOS imagers with a CCD output register. The invention is advantageous in other imager applications where charge packets alternately descriptive of image and of reference level are supplied to an electrometer.

What is claimed is:

1. A camera comprising:
    a solid state imager;
    a charge transfer channel disposed in said solid state imager;
    a succession of gate electrodes overlying said charge transfer channels to which plural-phase clocking voltages are applied in cyclic order for defining a succession of charge transfer stages in said charge transfer channel and for transferring charge packets from the earlier ones of said succession of charge transfer stages to the later ones;
    an electrometer for measuring the amplitudes of charge packets in a final one of said succession of charge transfer stages to generate respective samples of an electrometer response signal;
    means for introducing charge packets descriptive of image element intensities into alternate ones of the charge transfer stages of said charge transfer channel during recurrent halts in the application of plural-phase clocking signals to the gate electrodes overlying said charge transfer channel;
    means for introducing zero charge levels into the intervening ones of the charge transfer stages of said charge transfer channel during said recurrent halts in the application of plural-phase clocking signals to the gate electrodes overlying said charge transfer channel;
    means for separating the samples of said electrometer response signal responsive to charge packets descriptive of image element intensities from the samples not thus responsive; and
    means for differentially combining, with each of the samples of said electrometer response signal responsive to charge packets descriptive of image element intensities, an adjacent-in-time sample of said electrometer response signal not thus responsive, thereby to generate samples of a camera output signal.

2. A camera as set forth in claim 1 wherein said charge transfer channel is the output register of a CCD imager and is shielded from illumination.

3. A camera as set forth in claim 1 wherein said CCD imager is of the interline transfer type.

4. A camera as set forth in claim 2 having;
    means for injecting fat zero bias charge packets into the first one of said succession of charge transfer stages in said charge transfer channel, whereby said means for differentially combining generates samples of a camera output signal in which fat zero response is suppressed.

5. A camera as set forth in claim 4 wherein said CCD imager is of the interline transfer type.

6. A method for suppressing clock noise in the serial output of a parallel-input/serial-output CCD register during the shift register operation of successive ones of its charge transfer stages to provide said serial output, said method comprising the steps of:
    parallelly introducing a respective plurality of input-signal-responsive charge packets into alternate ones of the successive charge transfer stages of said CCD register during times said shift register operation is temporarily discontinued, thereby to leave charge packets representative of absence of input signal in the intervening charge transfer stages:
    sensing the amplitudes of charge packets successively shifted to a final one of the successive charge transfer stages of said CCD register to generate a succession of charge-sensing responses, alternately input-signal-responsive and not input-signal-responsive, undesirably attended by clocking noise; and
    differentially combining with each input-signalresponsive charge-sensing response sufficient measure of at least one of the adjacent-in-time charge-sensing responses to generate said serial output with said clocking noise substantially suppressed as compared to said charge-sensing responses.

7. A method for suppressing clock noise in the serial output of a parallel-input/serial-output CCD register as set forth in claim 6, further including the step of:
    introducing fat zero bias charge packets into the initial one of the successive charge transfer stages of said CCD register during their shift register operation, whereby the method of claim 6 is operative to suppress fat zero response in said serial output.

* * * * *